United States Patent
Hausmann et al.

(10) Patent No.: US 12,463,511 B2
(45) Date of Patent: Nov. 4, 2025

(54) DEVICE FOR TRANSFERRING CONDUCTOR PARTS INTO A DESIRED ARRANGEMENT

(71) Applicant: Gehring Technologies GmbH + Co. KG, Ostfildern (DE)

(72) Inventors: Ludwig Hausmann, Karlsruhe (DE); Jürgen Fleischer, Karlsruhe (DE); Andreas Wiens, Sachsenheim (DE)

(73) Assignee: Gehring Technologies GmbH + Co. KG, Ostfildern (DE)

( * ) Notice: Subject to any disclaimer, the term of this patent is extended or adjusted under 35 U.S.C. 154(b) by 580 days.

(21) Appl. No.: 17/802,234

(22) PCT Filed: Feb. 25, 2021

(86) PCT No.: PCT/EP2021/054644
§ 371 (c)(1),
(2) Date: Aug. 25, 2022

(87) PCT Pub. No.: WO2021/170699
PCT Pub. Date: Sep. 2, 2021

(65) Prior Publication Data
US 2023/0105264 A1 Apr. 6, 2023

(30) Foreign Application Priority Data
Feb. 25, 2020 (DE) .................... 10 2020 104 915.3

(51) Int. Cl.
*H02K 15/064* (2025.01)
*H02K 3/28* (2006.01)

(52) U.S. Cl.
CPC ............ *H02K 15/064* (2013.01); *H02K 3/28* (2013.01); *Y10T 29/49009* (2015.01)

(58) Field of Classification Search
CPC ... H02K 15/064; H02K 3/28; Y10T 29/49009
USPC .......................................... 29/596, 598, 605
See application file for complete search history.

(56) References Cited

U.S. PATENT DOCUMENTS

| | | | |
|---|---|---|---|
| 10,411,570 B2 * | 9/2019 | Ponzio | H02K 15/04 |
| 2009/0260219 A1 | 10/2009 | Takada et al. | |
| 2014/0196282 A1 * | 7/2014 | Stephenson | H02K 15/064 29/732 |

(Continued)

FOREIGN PATENT DOCUMENTS

| | | |
|---|---|---|
| GB | 1514608 A | 6/1978 |
| JP | H10174381 A | 6/1998 |
| JP | 2003324911 A | 11/2003 |

(Continued)

OTHER PUBLICATIONS

International Search Report and Written Opinion, PCT/EP2021/054644, filed Feb. 25, 2021. Mailing date of Search Report, May 28, 2021. pp. 1-10.

(Continued)

*Primary Examiner* — Thiem D Phan
(74) *Attorney, Agent, or Firm* — Bond, Schoeneck & King PLLC; George R. McGuire

(57) ABSTRACT

The invention relates to a device and a method for transferring conductor parts, in particular plug-in winding elements bent into a U-shape, also known as hairpins, into a desired arrangement.

7 Claims, 12 Drawing Sheets

(56) References Cited

U.S. PATENT DOCUMENTS

2018/0233999 A1    8/2018   Ponzio et al.

FOREIGN PATENT DOCUMENTS

| JP | 2004173357  A  | 6/2004 |
| JP |    3973592 B2  | 9/2007 |
| JP |    3975891 B2  | 9/2007 |
| JP | 2012151996  A  | 8/2012 |
| JP | 2018133862  A  | 8/2018 |
| KR | 20190017547 A  | 2/2019 |
| WO | 2011063109  A2 | 5/2011 |

OTHER PUBLICATIONS

Examination Report of Priority Application DE 10 2020 104 915.3, filed Feb. 25, 2020. pp. 1-7.

* cited by examiner

DEVICE FOR TRANSFERRING CONDUCTOR PARTS INTO A DESIRED ARRANGEMENT

CROSS-REFERENCE TO RELATED APPLICATION(S)

This application is the United States National Phase application filed under 35 U.S.C. 371 of International Application No. PCT/EP2021/054644, filed Feb. 25, 2021, which claims priority to German Patent Application No. 10 2020 104 915.3 filed with the German Patent Office on Feb. 25, 2020, the entirety of each of which is hereby incorporated by reference.

BACKGROUND

The invention relates to a device and a method for transferring conductor parts, in particular substantially plug-in winding element conductor parts bent into a U-shape, also known as hairpins, into a desired arrangement.

In the production of electromechanical transducers, in particular electric motors, in particular for traction drives, individual winding elements (plug-in winding elements, so-called "hairpins") are produced, which are further processed to form a stator winding in the further process.

The plug-in winding elements are usually made from flat wire in order to achieve a higher degree of filling in the stator slot of the electric motor than winding elements made from round wire and thus increase the efficiency thereof. Within the scope of the invention, the use of plug-in winding elements with any, in particular convex, conductor cross-sections is possible, i.e. for example round or rectangular cross-sections. Within the context of producing the winding elements, corresponding conductor parts are cut off from endless material and formed into suitable winding elements. Typically, the majority of the conductor parts arranged in a stator are produced with the same or a similar geometric shape and the stator core is used. After insertion, the free ends of the winding elements are generally reshaped and contacted according to the electrical wiring diagram, for example by welding the free ends in pairs.

SUMMARY OF THE INVENTION

The object of the present invention is to provide a way of transferring, as quickly and cost-effectively as possible, the conductor parts into an arrangement, referred to below as the desired arrangement, which is particularly suitable for gripping and inserting the conductor parts into a stator core.

This object is achieved according to the invention by a device for arranging conductor parts, in particular hairpins, the device comprising a supply unit, a carry-over region and an arrangement unit and, independently thereof, by a method.

In the present context, the desired arrangement can mean an arrangement of the conductor parts in which these are distributed in a circumferential direction on a plurality of circular paths arranged concentrically to one another or on portions of concentric circular paths, so that the conductor parts are arranged in radially aligned rows which are spaced apart from one another in the circumferential direction via radial gaps extending in the radial direction.

When using hairpin conductor parts, the desired arrangement in particular can comprise that the respective free legs of the hairpins are arranged in different radially aligned rows. The respective free legs can be arranged on the same or on different circular paths.

It may be the case that different types of hairpins are used within the scope of the method according to the invention. In particular, it may be the case that hairpins having different leg widths, i.e. the distance between the two free legs, are used. Typically, different types of hairpins are arranged with at least one of their respective legs arranged in different radial rows and/or circular paths. Furthermore, conductor parts of which the two free ends are not on the same side after being inserted into a stator core (so-called I-pins) can be brought into a desired arrangement within the scope of the method according to the invention. Accordingly, the device can be designed to transfer different types of hairpins and I-pins (I-pins are used, for example, as rod-shaped interconnection elements that are not designed with two legs) into the desired arrangement.

The device according to the invention is therefore used for arranging conductor parts, in particular hairpins.

The device comprises a supply unit, a carry-over region and an arrangement unit.

The supply unit is designed to provide conductor parts. The supply unit can comprise a conveying unit. The conveying unit can comprise a circulating belt. The belt, in turn, can be designed with protruding projections, the projections being designed as contact portions for conductor parts. The supply unit can therefore be designed to supply conductor parts from a conductor part supply or a conductor part insertion portion of the arrangement unit. A conductor part insertion portion can mean a portion in which the individual conductor parts or hairpins are inserted into the device. From there, the hairpins can be moved into the supply unit by means of the conveying unit and transferred into the carry-over region.

The carry-over region is designed for carrying over the conductor parts from the supply unit into the arrangement unit. Delivering the conductor parts into the arrangement unit takes place in the carry-over region, so to speak. The carry-over region can be seen as the interface between the supply unit or conveying unit and the arrangement unit.

The arrangement unit is used to transfer the conductor parts into the desired arrangement. If the conductor parts or hairpins are in the desired arrangement, they can be moved in the axial direction, removed from the arrangement unit and inserted directly into a stator core in this configuration.

In this case, the arrangement unit comprises a pick-up unit. The arrangement unit is designed to carry over the conductor parts from the supply unit and thereby transfer them into the desired arrangement by means of a rotational movement of the pick-up unit relative to the supply unit in the carry-over region. The arrangement unit is designed in such a way that the conductor parts are carried over and thereby transferred into the desired arrangement by means of a rotational movement of the pick-up unit relative to the supply unit in the carry-over region.

As already explained above, the conductor parts in the desired arrangement are distributed in a circumferential direction on a circular path (or a plurality of circular paths) or on portions of a circular path (or a plurality of circular paths). (In particular, the desired arrangement can comprise that the hairpins are distributed in the circumferential direction on a plurality of circular paths arranged concentrically to one another or on portions of concentric circular paths, so that the conductor parts are arranged in radially aligned rows which are spaced apart from one another in the circumferential direction via radial gaps extending in the radial direction.) The relative rotational movement between the pick-up unit and the supply unit ensures that the conductor parts are arranged quickly and reliably.

It may be the case that the pick-up unit is provided as a rotating unit in the device or in the arrangement unit. The supply unit, on the other hand, can be stationary and can be designed with components that move in the supply unit, such as the circulating belt. The pick-up unit can thus be rotatably arranged in the arrangement unit. This allows the conductor parts to be picked up easily and the conductor parts to be transported away from the pick-up location or the carry-over region accordingly. The pick-up unit is therefore designed as a rotatable unit. The pick-up unit has contact portions or stops, for example projections, for positioning the conductor parts. Due to its structure, the pick-up unit thus specifies the desired arrangement of the conductor parts.

The pick-up unit can have a circular outer contour with protruding projections distributed around the circumference of the outer contour. The projections can each be provided as contact portions for the conductor parts. The projections can be used to define the intended desired arrangement. Furthermore, the projections can promote transport of the conductor parts. It may be the case that the pick-up unit comprised by the arrangement unit can be exchanged. The pick-up unit can be designed as a ring gear. If necessary, the projections of the pick-up unit can pick up a plurality of rings of conductor parts. A ring corresponds to the arrangement of a single layer of hairpins in the radial direction.

As mentioned above, the supply unit can comprise a conveying unit which is designed to move conductor parts into the carry-over region. The conveying unit can in turn comprise two conveying units which are designed and arranged in the supply unit in such a way that they are each designed to convey a leg of a hairpin-shaped conductor part into the carry-over region.

Each of the conveying units can be designed with a circulating belt which is in each case designed with protruding projections, the projections being designed as contact portions for conductor parts.

The conveying unit can also comprise a correspondingly shaped lead screw, although the use of a belt or a plurality of belts has proven to be more flexible and gentler. Other types of conveying units are conceivable.

The conveying unit or conveying units are in particular in contact with at least (or are designed for this purpose) a free leg of the hairpins to be moved and move them into the carry-over region.

It may be the case that in the device the carry-over region has a first delivery portion and a second delivery portion. The first delivery portion is designed for transitioning a first leg of a hairpin-shaped conductor part into the arrangement unit. The second delivery portion is designed for transitioning a second leg of the same hairpin-shaped conductor part into the arrangement unit. The delivery portions are spatially separated from one another or are designed in such a way that they transfer the respective legs into the arrangement unit at different points of the carry-over region.

The pick-up unit can be mechanically synchronized with the conveying unit(s), so that the delivery rate by means of the conveying units is synchronized with the carry-over or removal rate by means of the pick-up unit. This can be achieved, for example, via a toothed belt or toothed wheel connection. In principle, a wide variety of drives such as electric, pneumatic or hydraulic drives for the conveying unit and the pick-up unit are conceivable, which are not mechanically dependent on one another but are synchronized with one another by means of a suitable controller.

In particular, it may be the case that the conveying unit conveys the conductor parts into the carry-over region, with a guide element adjusted to the outer contour of the pick-up unit and designed to complement it being provided, for example attached, in the carry-over region. If a plurality of conveying units is provided, a corresponding number of guide elements can also be provided. The guide elements can in particular form a supply path, which is designed like a channel, for example, for the individual conductor parts. The conductor parts move along this supply path and enter the pick-up unit, for example the gaps of the ring gear that forms the pick-up unit.

The device can also have an insertion unit (e.g. a robot arm having a gripper) which is arranged and designed to additionally insert individual conductor parts or hairpins into the pick-up unit. In this way, for example, special conductor parts, special pins can be used at specific positions. In order to have the necessary space for additionally inserting conductor parts, gaps can already be left when loading the conveying unit.

The device can have a drive, for example a motor, to bring about the rotational movement between the pick-up unit and the carry-over region. In particular, the drive can drive or rotate the pick-up unit directly.

Alternatively or in addition to the drive, a manual drive unit can also be provided, which is designed to manually actuate the pick-up unit.

A decoupling unit can be provided which is designed and arranged to push the respective free legs out of engagement with the conveying unit.

Also according to the invention is a method for arranging conductor parts, in particular hairpins, in the desired arrangement in an arrangement unit.

As mentioned, the conductor parts in the desired arrangement are distributed in a circumferential direction on a circular path or on portions of a circular path.

The method comprises moving the conductor parts sequentially into a carry-over region by means of a supply unit. The method further comprises carrying over the conductor parts from the supply unit into a pick-up unit of an arrangement unit by means of a rotational movement between the pick-up unit and the supply unit. The conductor parts are also transferred into the desired arrangement by means of the rotational movement.

In particular, at least some of the conductor parts are hairpins. When the hairpins are carried over, first a first leg is carried over into the arrangement unit in its intended position in the desired arrangement. A second leg of the same hairpin is subsequently carried over into its intended position in the desired arrangement.

BRIEF DESCRIPTION OF THE DRAWINGS

The invention is described in more detail below with reference to the drawings, the same or functionally equivalent elements being provided only once with reference signs if necessary.

In the drawings.

DETAILED DESCRIPTION

Figure 1:
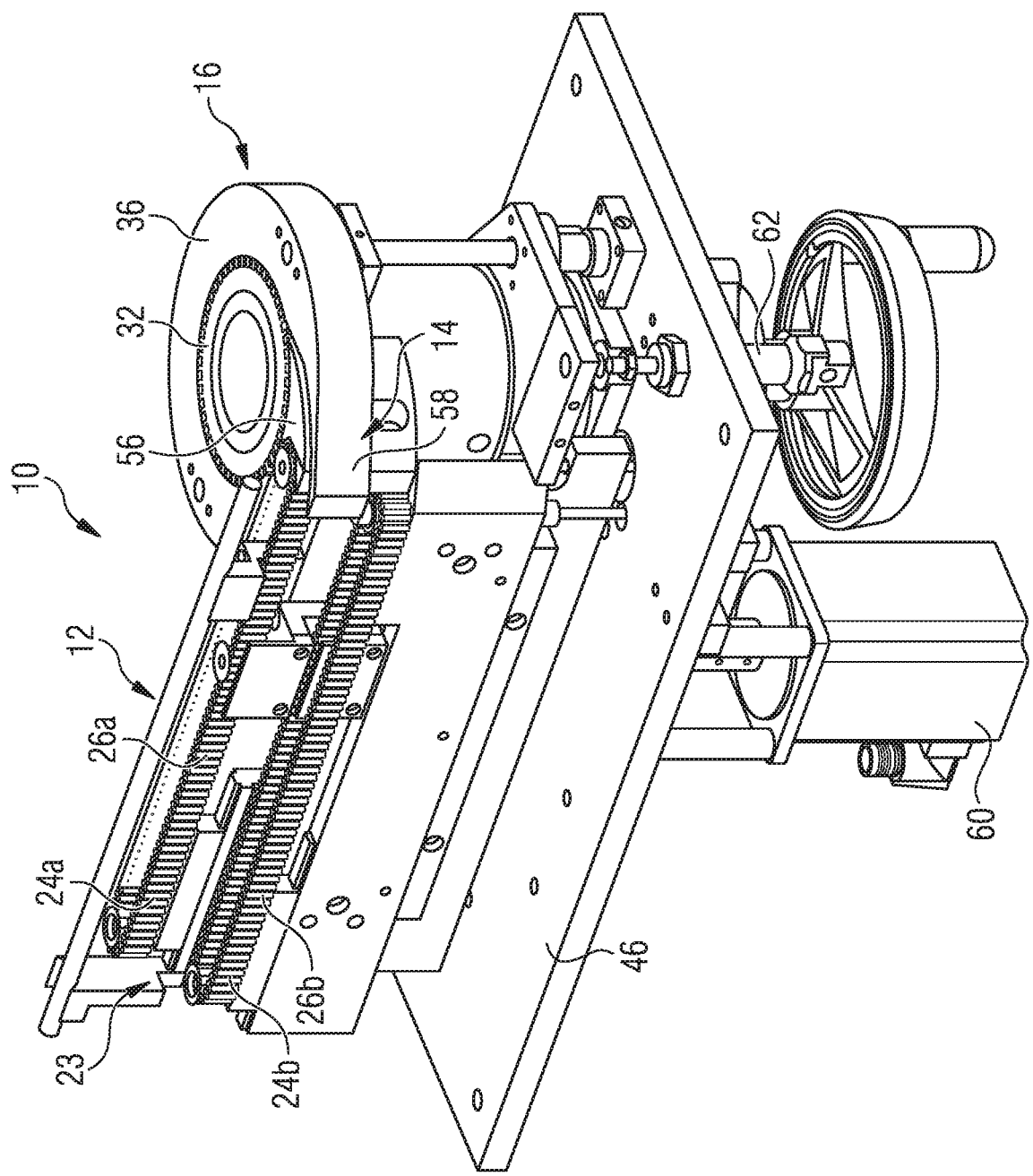
FIG. 1 shows a device according to the invention.

FIG. 1 is a perspective representation of a device 10 according to the invention. The device 10 according to the invention is used for arranging conductor parts, in particular hairpins, in a desired arrangement.

Figure 3:
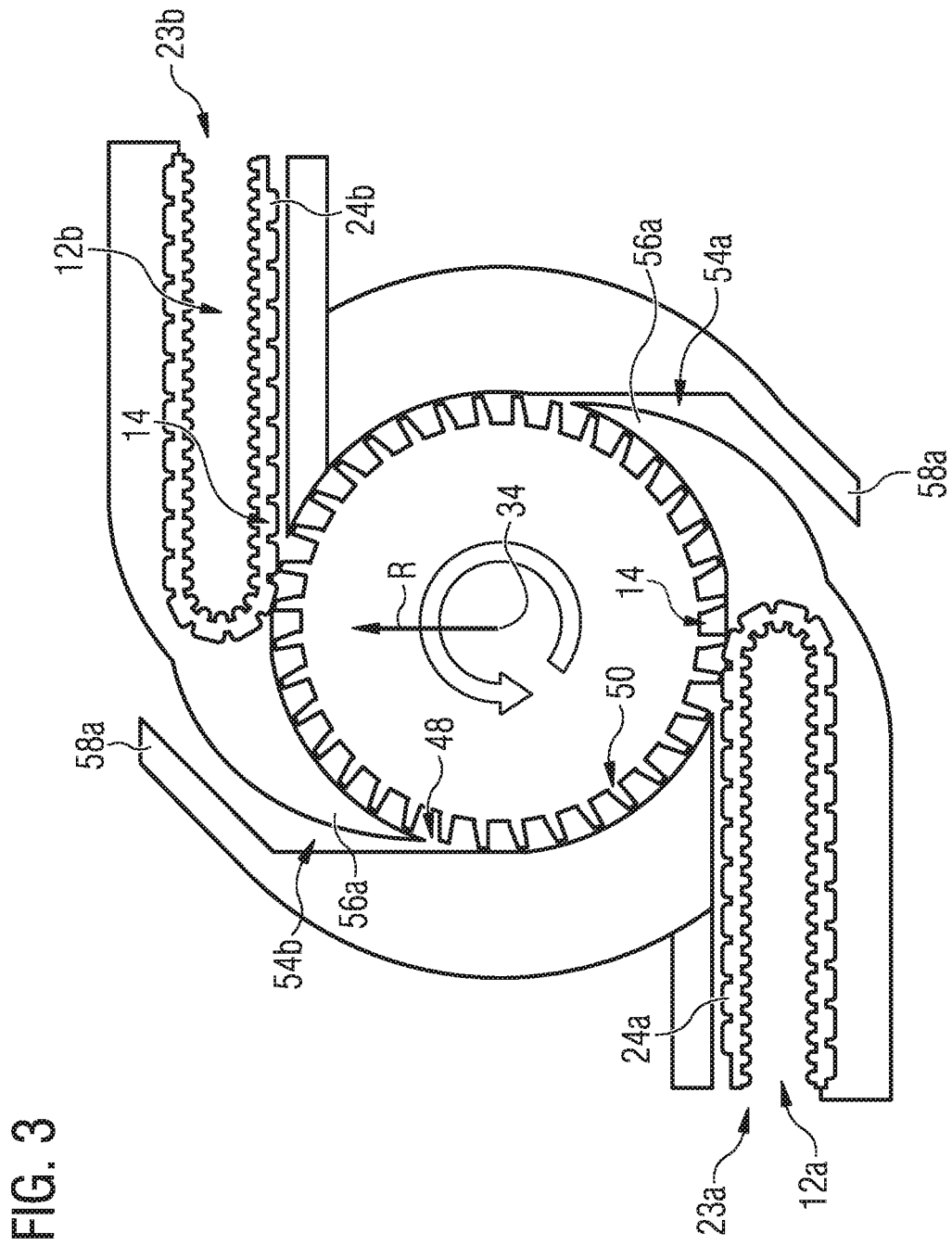
FIG. 3 shows an alternative embodiment of a carry-over region and an arrangement unit.

The device 10 comprises a supply unit 12, a carry-over region 14 and an arrangement unit 16. FIG. 3 shows a variant with a first supply unit 12a and a second supply unit 12b.

Figure 4:
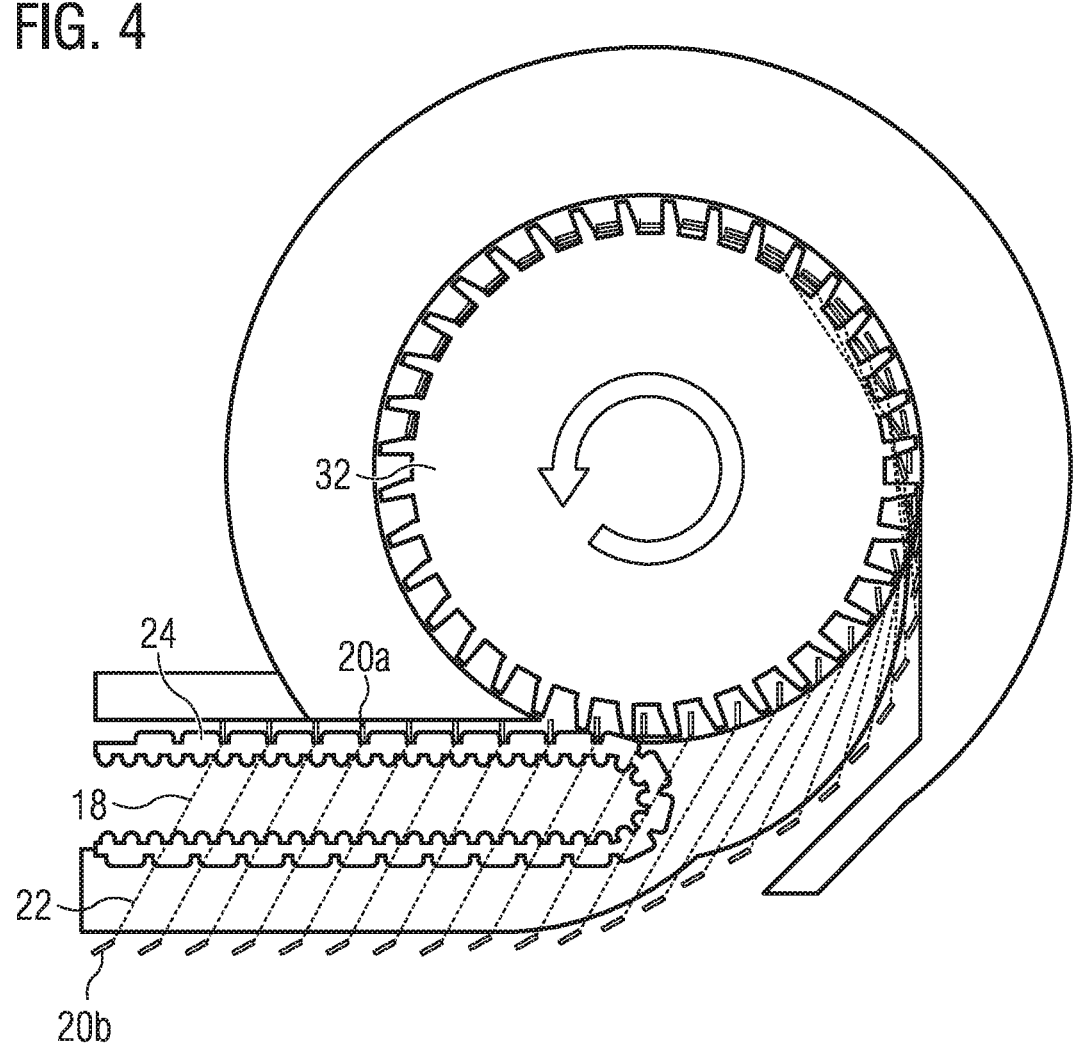
FIG. 4 shows a simplified device in operation in a plan view.
Figure 14:
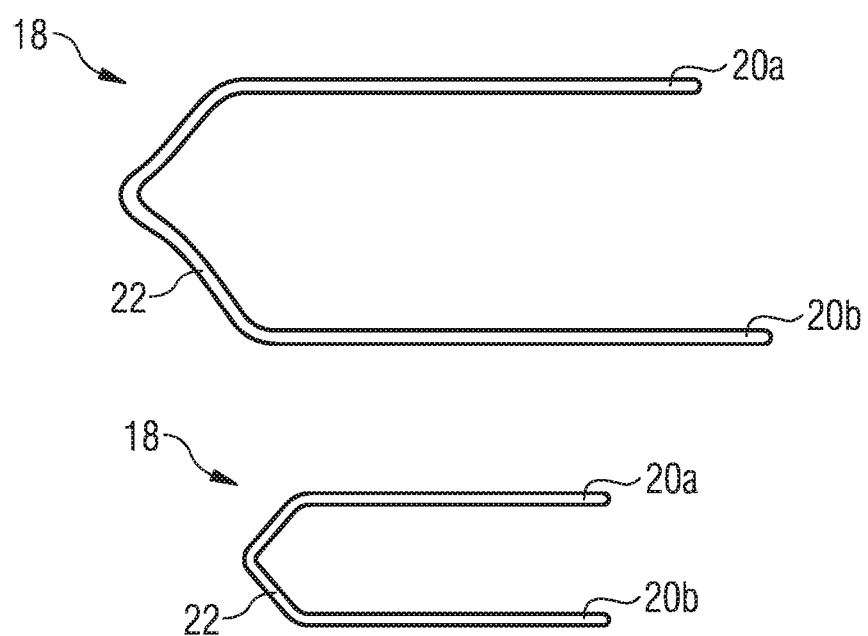
FIG. 14 shows two hairpins.

The supply unit 12 is designed to provide conductor parts 18 (see, for example, FIG. 4). The conductor parts 18 are typically designed as hairpin conductor parts or hairpins. Hairpin conductor parts have a first free leg 20a (extending in a straight line), a second free leg 20b and a connecting portion 22 which connects the two free legs 20a and 20b to one another (see FIG. 14). The use of other conductor parts, such as I-pins, is possible. In addition to hairpins (having two legs), I-pins can also be inserted into the conveying unit and delivered to the pick-up unit.

The supply unit 12 can comprise a conveying device 23. The conveying device 23 is designed to move conductor parts 18 into the carry-over region.

Figure 2:
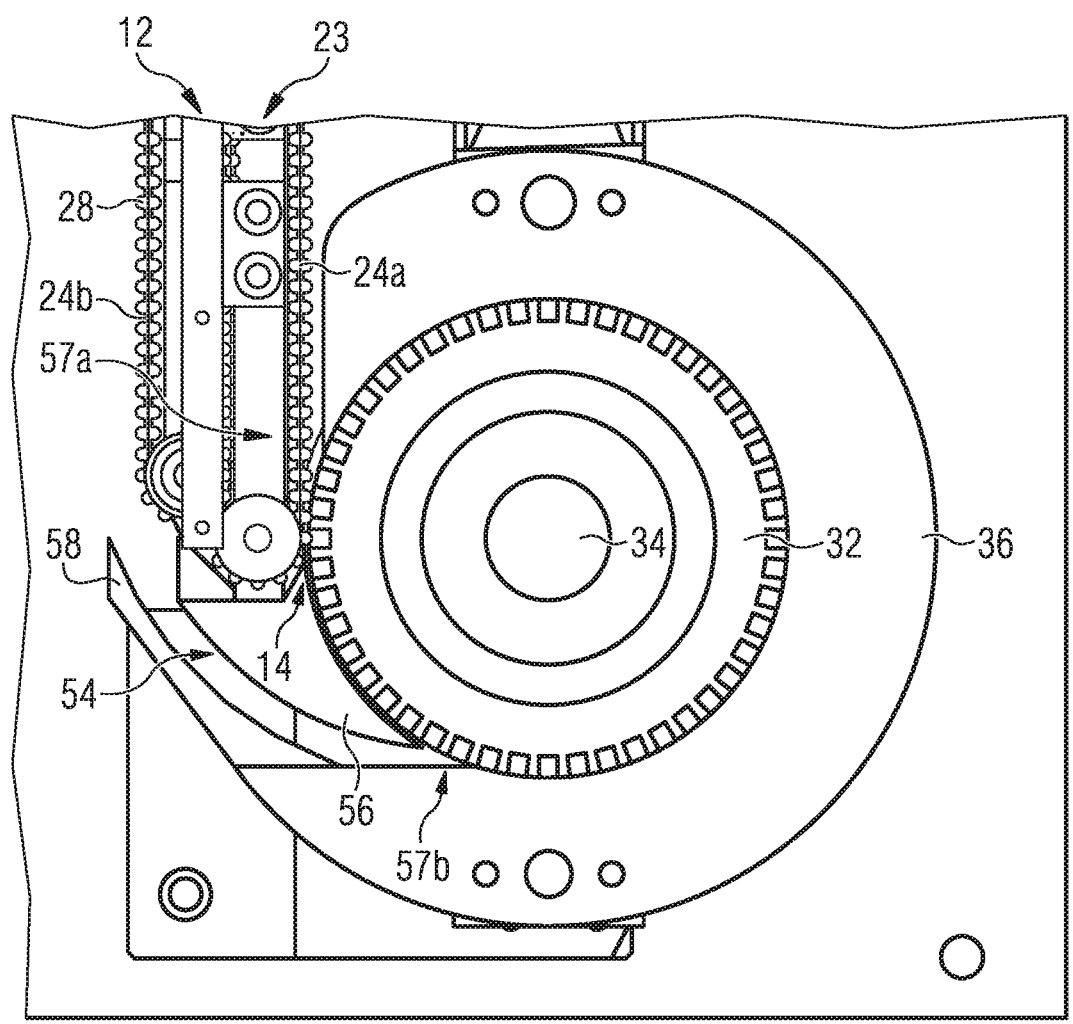
FIG. 2 shows an enlarged portion from FIG. 1.

In the example of FIG. 1 or FIG. 2, the conveying device 23 comprises a first conveying unit 24a and a second conveying unit 24b. The conveying units 24a and 24b each comprise a circulating belt 26a and 26b. During the conveying process, the conveying units 24a and 24b are each in active contact with a leg 20 of a hairpin.

FIG. 3 illustrates the possibility that a plurality, here two, conveying devices 23, a first conveying device 23a and a second conveying device 23b, are provided (corresponding to two supply units 12). In this example, each of the conveying devices 23a and 23b comprises a conveying unit 24a or 24b which each comprise a circulating belt. A plurality of conveying units 24 can be provided for each conveying device 23 (similar to the embodiment of FIGS. 1 and 2).

The relevant belt 26 or 26a, 26b, in turn, can be designed with protruding projections 28. The projections 28 are designed as contact portions for conductor parts 18. The supply unit 12 can therefore be designed to convey conductor parts 18 from a conductor part supply or a conductor part insertion portion 30 (see FIG. 8).

Figure 12:
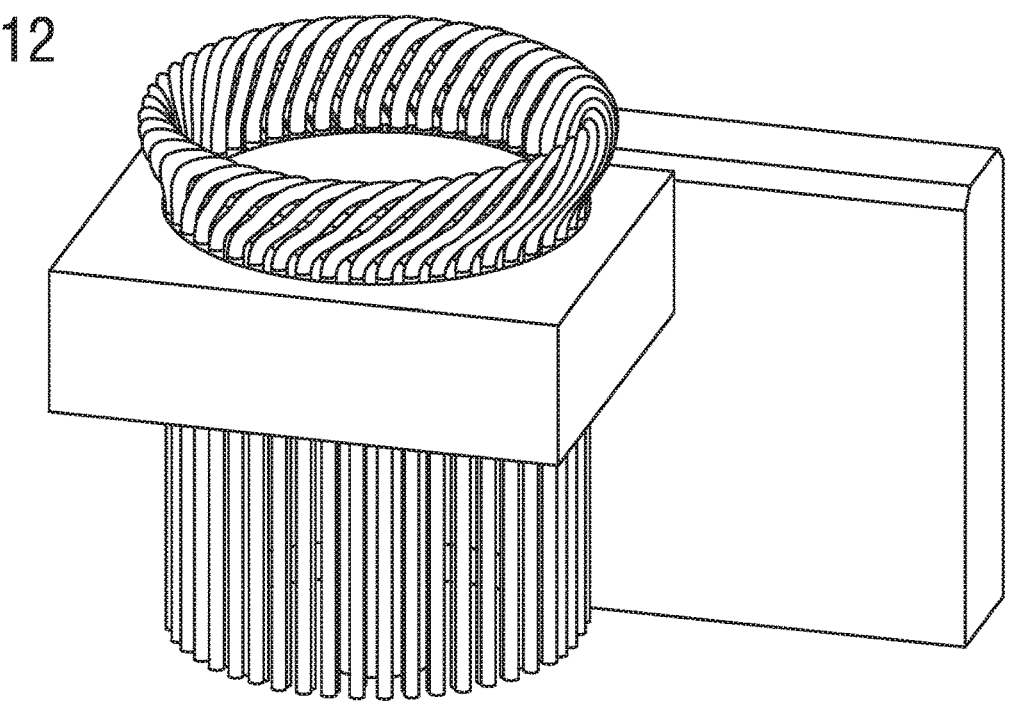
FIG. 12 is a representation according to FIG. 11 in a more advanced state.
Figure 13:
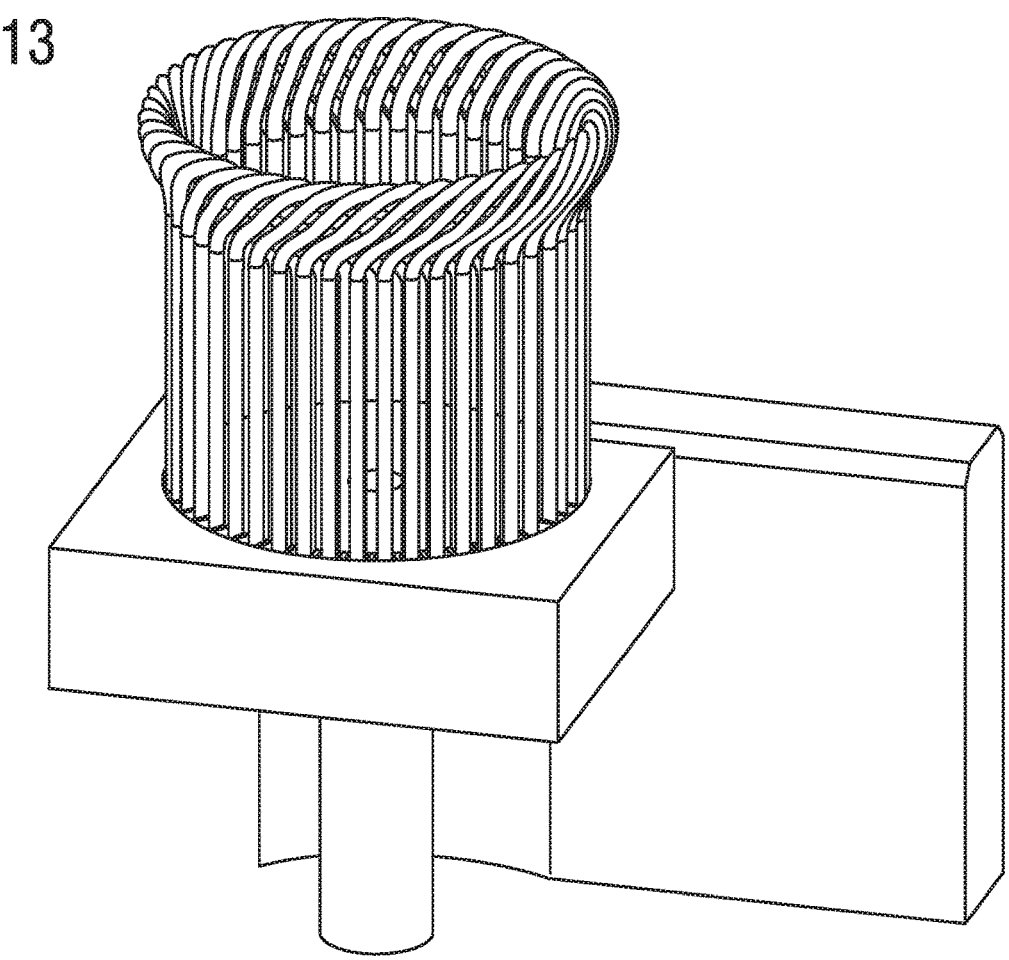
FIG. 13 is a representation according to FIG. 12 in a more advanced state.

The arrangement unit 16 is used to transfer the conductor parts into the desired arrangement (FIG. 12). If the conductor parts 18 or hairpins are in the desired arrangement, they can be removed from the arrangement unit 16 (FIG. 13) and inserted directly into a stator core in this configuration (see also FIG. 10-13).

The arrangement unit 16 comprises a pick-up unit 32. In the present case the pick-up unit 32 (FIGS. 1 to 6) is designed as a ring gear which is designed to be rotatable about an axis of rotation 34. A guide structure 36 can be arranged around the pick-up unit 32, which prevents hairpins 18, when they are arranged in the pick-up unit 32, from being able to be moved out laterally (in the radial direction). It may be the case that the arrangement unit 16 with the conductor parts 18 arranged therein can be removed in order to transfer said unit to the stator core, or the basket formed from conductor parts in the pick-up unit may be pushed so far out of the arrangement unit after completion that it can be removed from the arrangement unit. The arrangement unit is not moved in the process.

The arrangement unit 16 is designed to carry over the conductor parts from the supply unit 12 and thereby transfer them into the desired arrangement by means of a rotational movement of the pick-up unit (rotation about the axis of rotation 34) relative to the supply unit 12 in the carry-over region 14.

FIG. 4 shows how the first conductor parts 18 are taken out of engagement with the circulating belt 26 by contacting the pick-up unit 32 and are transferred into the desired arrangement.

Figure 5:
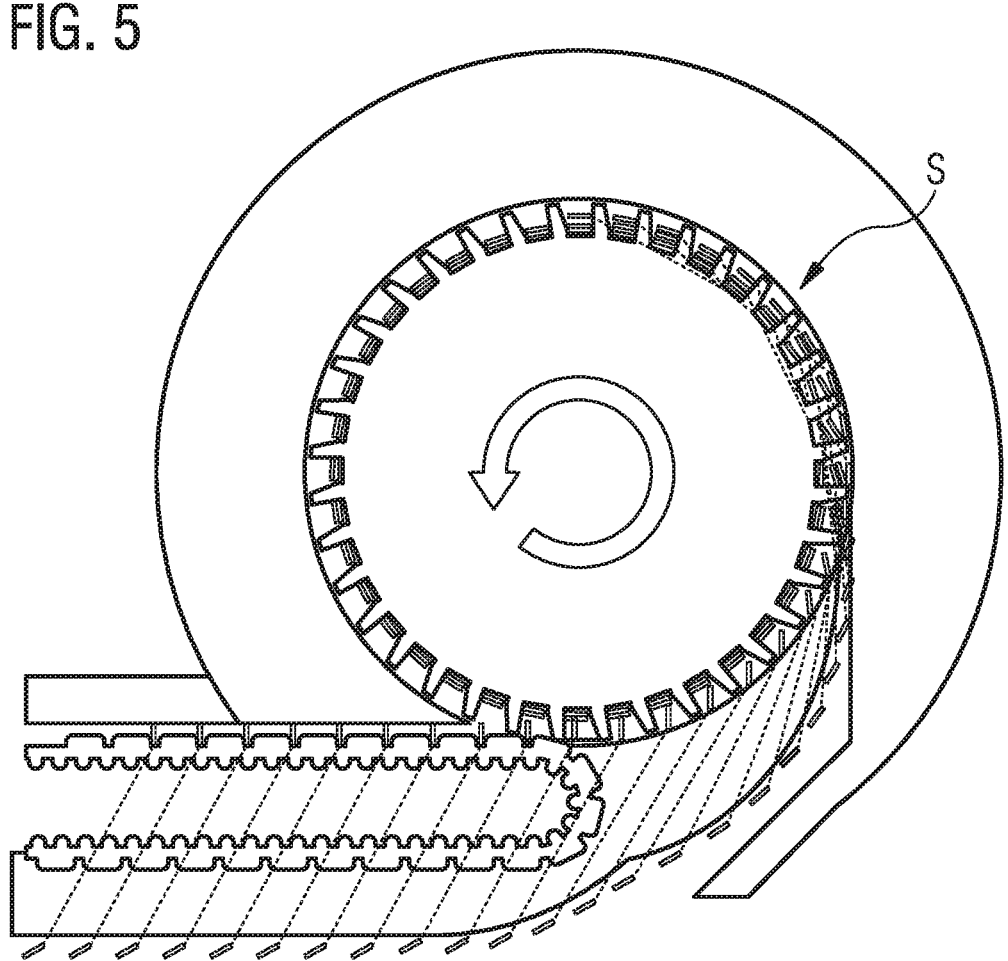
FIG. 5 shows the device from FIG. 4 in operation.
Figure 9:
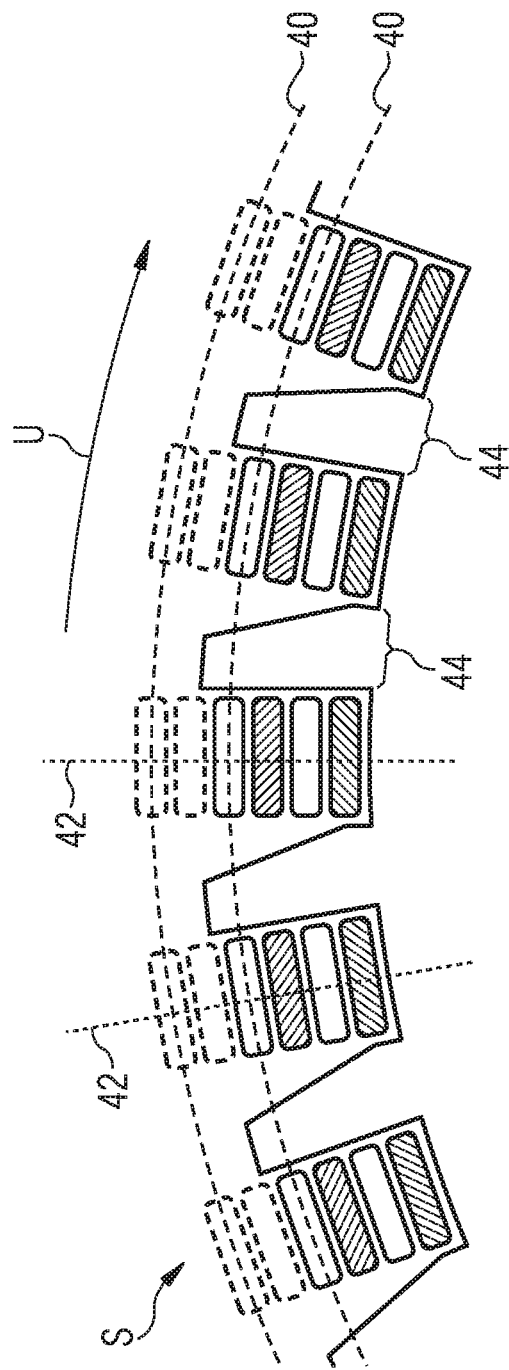
FIG. 9 shows conductor parts in the desired arrangement thereof in an arrangement unit.
Figure 10:
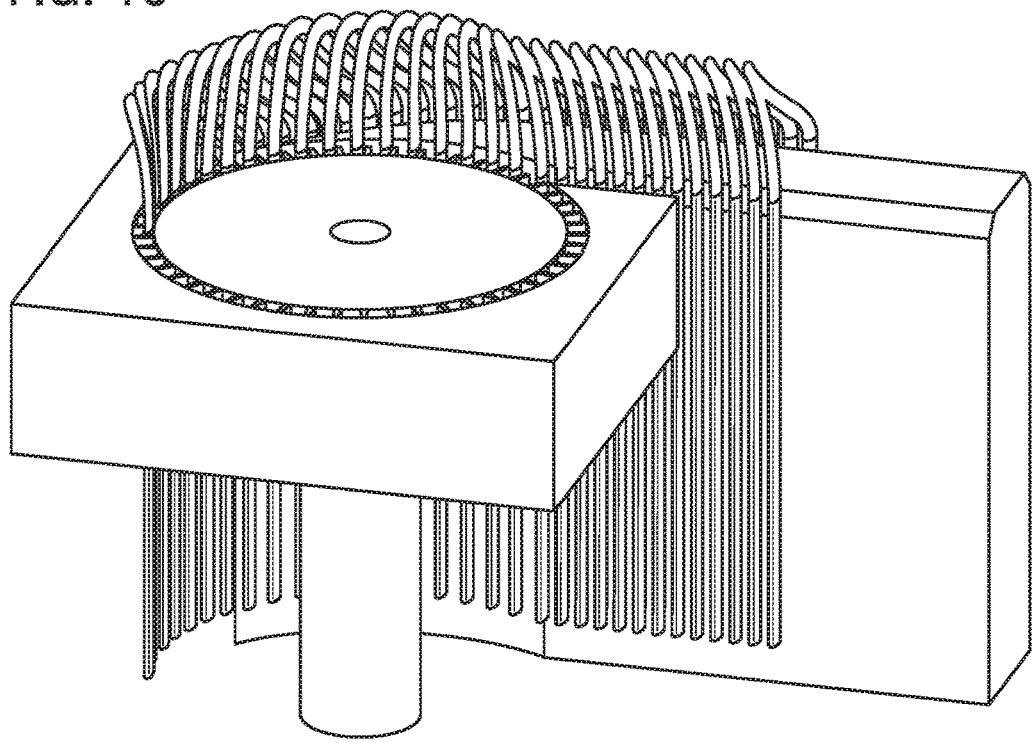
FIG. 10 is a schematic representation of the arrangement of conductor parts by means of a device according to the invention or the method according to the invention.
Figure 11:
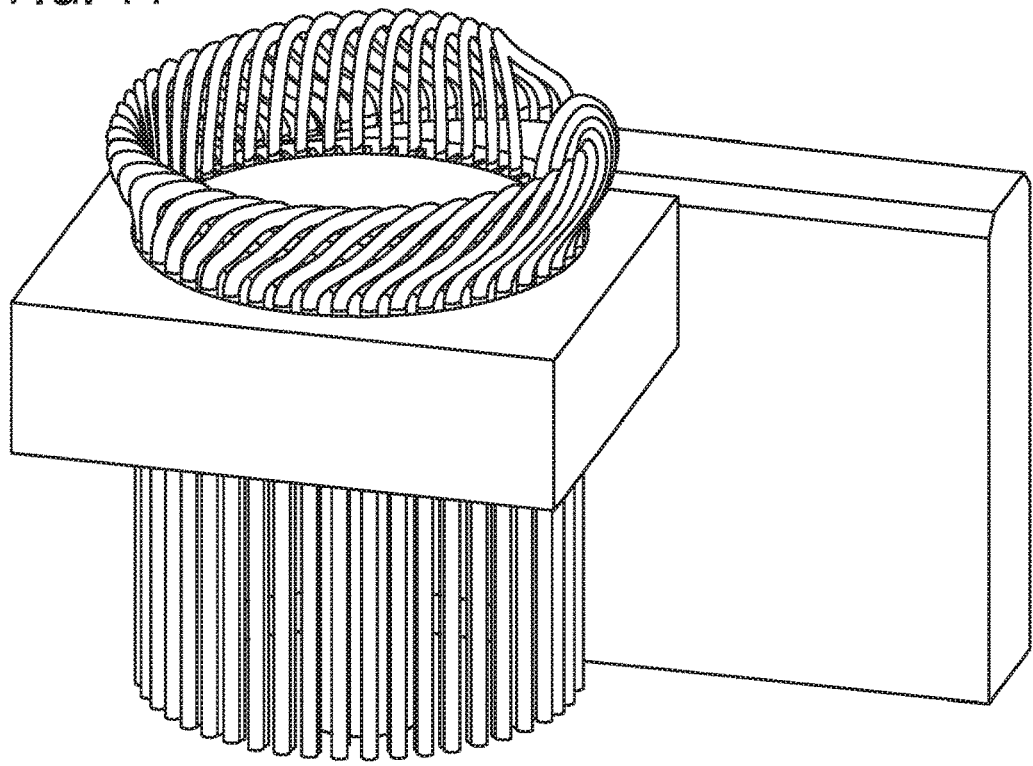
FIG. 11 is a representation according to FIG. 10 in a more advanced state.

In FIG. 5, a large number of conductor parts are already in the desired arrangement S. In the desired arrangement S, the conductor parts 18 are distributed in a circumferential direction U on a plurality of circular paths 40 arranged concentrically to one another or on portions of concentric circular paths 40, so that the conductor parts are arranged in radially aligned rows 42 which are spaced apart from one another in the circumferential direction U via radial gaps 44 extending in the radial direction R (see also FIG. 9).

In the example of FIGS. 1 and 2, the pick-up unit 32 is designed as a rotating unit in the device 10 or in the arrangement unit 16. It is also conceivable, however, for the supply unit 12 to be moved in a circle around the pick-up unit 32 in order to generate the rotational movement. However, there are structural advantages in the supply unit 12 being stationary on a device base 46 and rotatably arranging only the pick-up unit 32 within the arrangement unit 16. In FIG. 1, a drive 60 designed as a motor and a manual drive unit 62 are arranged below the device base 46 to generate the rotation of the pick-up unit 32. The drive 60 and the manual drive unit 62 can move the supply unit 12 or its conveying units 24 and the pick-up unit 32 so that they are synchronized with respect to one another. A relevant individual drive is possible. The individual drives can be synchronized with one another.

A lift cylinder can be provided, which pushes the hairpin package arranged in the pick-up unit upward, so that the upper hairpin ends protrude from the pick-up unit and can be gripped by a gripper, for example for further insertion into a stator.

As already mentioned above, the pick-up unit 32 is designed as a ring gear in the present case and has a circular outer contour 48 with protruding projections 50 distributed around the circumference of the outer contour 48. The projections 50 are used as stops and at the same time as drivers for the respective conductor parts 18 so that these can be accommodated in the gaps 52 between the projections and carried over from the supply unit 12 into the carry-over region 14. The projections 50 protrude so close to the guide structure 36 that the conductor parts 18 cannot be moved out of the gaps 52. The relative rotational movement between the pick-up unit 32 and the supply unit 12 ensures that the conductor parts 18 are arranged quickly, gently and reliably (FIG. 2). Other mechanisms for carrying over conductor parts are conceivable, for example by means of suction via pneumatic nozzles designed as vacuum nozzles or the like.

The carry-over region 14 is designed for carrying over the conductor parts 18 from the supply unit 12 into the arrangement unit 16. Delivering the conductor parts into the arrangement unit 16 takes place in the carry-over region 14, so to speak. The carry-over region 14 can be seen as the interface between the supply unit 12 or conveying unit 24 and the arrangement unit 16.

As can be seen clearly in FIGS. 4 and 5, the conductor parts 18 are held in the circulating belt 24 in such a way that they protrude slightly between the projections 28 of the belt 24. The projections 50 of the ring gear or the pick-up unit 32 make contact with these portions of the conductor parts 18 that protrude from the belt 24. In this state, the conductor parts 18 are guided both by the circulating belt 24 and by the ring gear 32. If the conductor parts 18 enter the front region of the supply unit 12 in which the circulating belt 24 changes direction, the conductor parts 18 disengage from the circulating belt 24 and are held between the ring gear 32 and the guide structure 36.

In the example from FIG. 2 it can be seen that the respective legs 20 of the hairpin conductor parts 18 are guided by different belts 24a and 24b. The first leg 20a of a relevant hairpin 18 is transferred directly into the pick-up unit 32 in the carry-over region 14. The relevant second leg 20b is introduced into a guide channel 54. The first leg 20a of a relevant hairpin 18 is correspondingly transferred first into the pick-up unit 32 and the second leg 20b is also transferred into the pick-up unit 32 or brought into engagement with the pick-up unit 32 at a later time. The first leg 20a, which is already in engagement with the pick-up unit 32, pulls the second leg 20b along the guide channel 54.

The guide channel 54 is formed between an inner guide element 56 and an outer guide element 58. The inner guide element 56 at the same time forms part of the guide structure 36. The inner guide element 56 is formed in the region of the carry-over region 14 in order to transfer the conductor parts 18 from the supply unit 12 into the pick-up unit 32. In the present example, the region in which the first legs 20a of the hair pins 18 are transferred into the pick-up unit 32 forms a first delivery portion 57a. The region in which the second legs 20b are delivered from the guide channel 54 to the pick-up unit 32 forms a second delivery portion 57b.

Correspondingly, the device 10 in the example of FIG. 3 has two carry-over regions 14, which each in turn comprise a first delivery portion 57a and a second delivery portion 57b.

Figure 6:
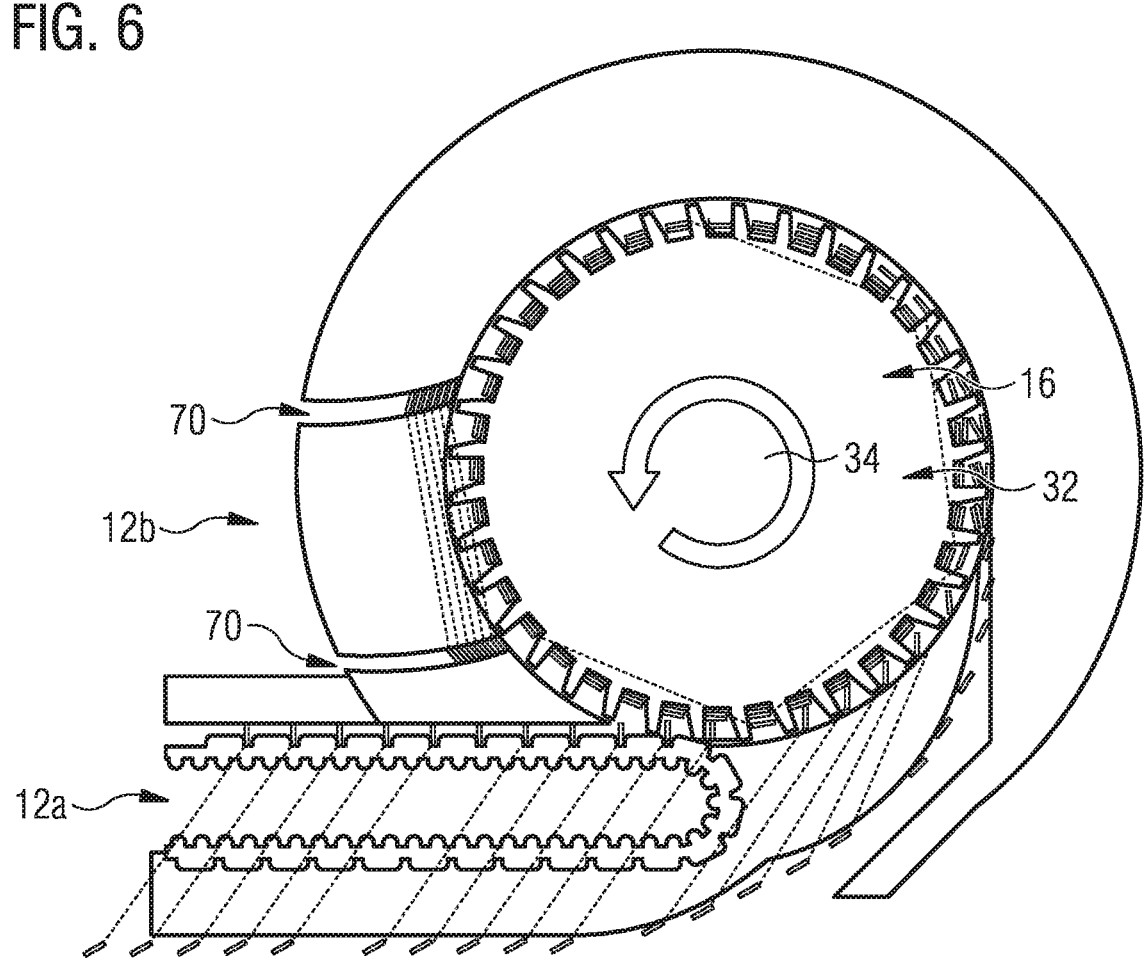
FIG. 6 shows an alternative embodiment of the device from FIGS. 4 and 5.

FIG. 6 illustrates a device 10 which has two different types of supply units 12a and 12b. The first supply unit 12a is constructed similarly to the supply units 12 of FIG. 1 or 2 and comprises a circulating belt 26 as part of a conveying device 23. The second supply unit 12b comprises two channels 70, each of which is designed to transfer free legs 20 of hairpins or individual conductor parts 18 into the arrangement unit 16 or its pick-up unit 32. Both legs 20 are transferred at the same time. The hairpins 18 or the free legs 20 thereof can be arranged so as to be tensioned in the channels 70 in the direction of the pick-up unit 32. A release mechanism can be provided in each case in order to release a movement of the hairpins or the relevant transition thereof into the pick-up unit 32 and otherwise to secure them.

Figure 7:
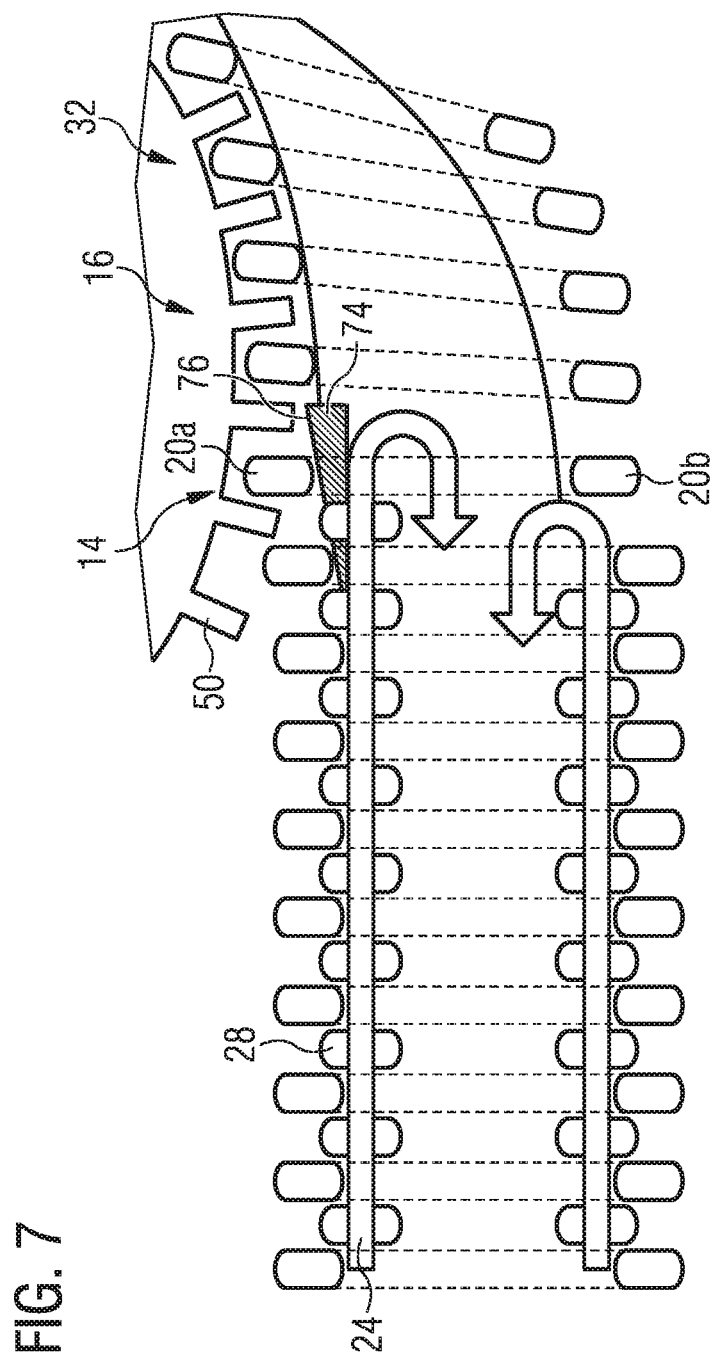
FIG. 7 is a schematic representation of a carry-over region.

FIG. 7 illustrates the carry-over region 14 in detail. A decoupling unit 74 can be provided in the carry-over region 14 which is designed to push the free leg 20a out of engagement with the conveying unit 24. For this purpose, the decoupling unit 74 in the present example has a contact surface 76 which is arranged and designed to contact a side of the leg 20a facing the conveying unit 24 and to push it away from the conveying unit 24 and in the direction of the pick-up unit 32. The decoupling unit 74 is designed in the shape of a wedge element arranged above the conveying unit 24.

Figure 8:
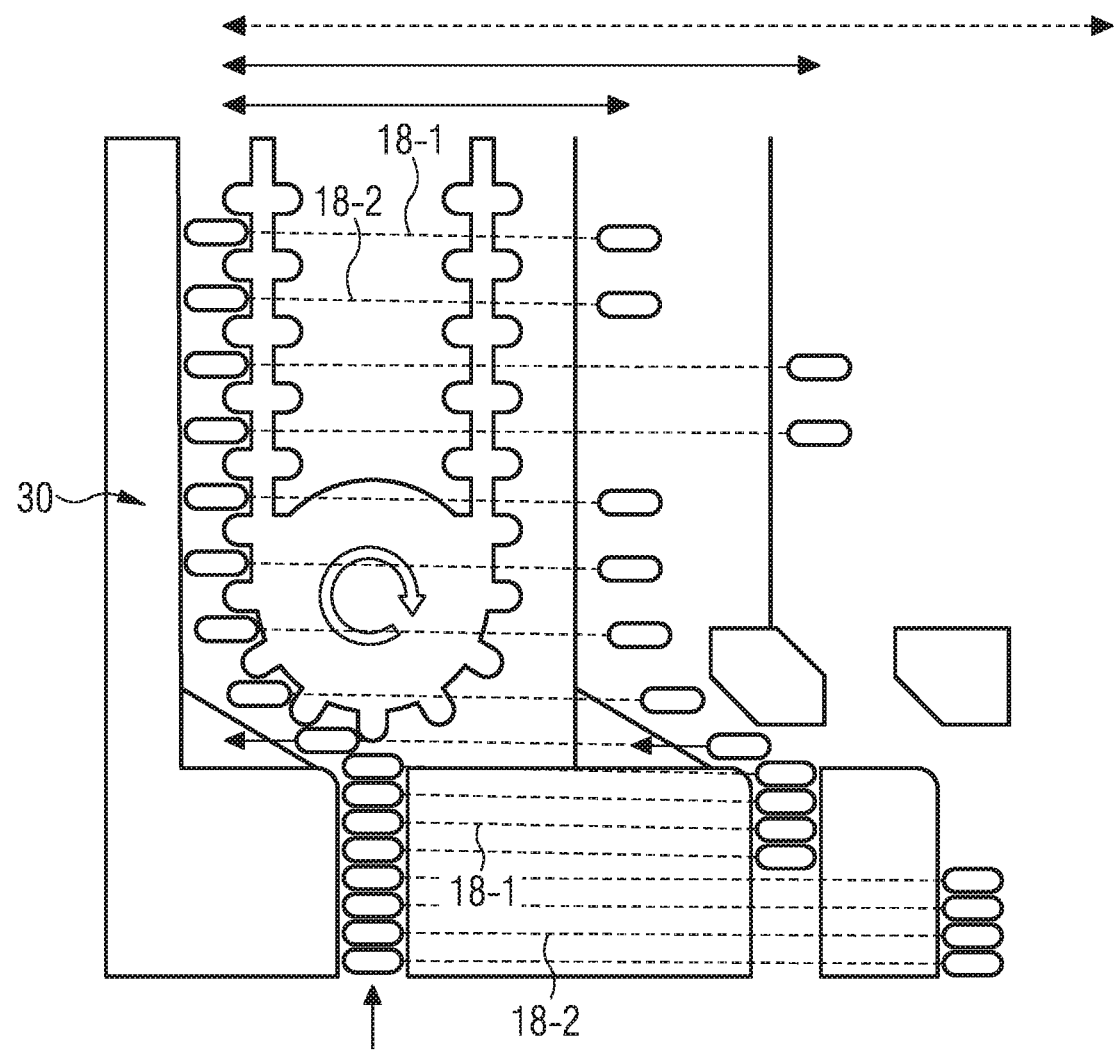
FIG. 8 is a schematic representation of a conductor part insertion portion.

FIG. 8 shows a conductor part insertion portion 30 which can be used with the device from FIGS. 1 and 2 and other devices. The conductor part insertion portion 30 from FIG. 8 is designed to insert conductor parts 18 of different widths, i.e. with different distances between the free legs 20a and 20b or with differently designed connecting portions 22, into the supply unit 12. Correspondingly, the supply unit 12 has a plurality of guides for the differently arranged second free legs 20b of the hairpins 18. In the example of FIG. 8, the conductor part insertion portion 30 is designed for use with two different types of hairpins 18-1, 18-2. The use of other types of hairpins 18 is conceivable. Three, four, five or more types of different hairpins can be used. Other conductor parts can also be used. For example, I-pins can be used.

The invention claimed is:

1. Device for arranging conductor parts, the device comprising a supply unit, a carry-over region and an arrangement unit; wherein
    the supply unit is designed to provide conductor parts;
    the carry-over region is designed for carrying over the conductor parts from the supply unit into the arrangement unit;
    the arrangement unit comprises a pick-up unit and is designed to carry over the conductor parts from the supply unit and thereby transfer them into a desired arrangement by means of a rotational movement of the pick-up unit relative to the supply unit in the carry-over region, wherein the conductor parts in the desired arrangement are distributed in a circumferential direction on a circular path or on portions of a circular path, and
wherein the device (10) comprises a second supply unit (12b), wherein the second supply unit (12b) comprises at least one channel (70), wherein the channel (70) is designed to transfer free legs (20) of hairpins or individual conductor parts (18) into the pick-up unit (32) of the arrangement unit.

2. Device according to claim 1, wherein the pick-up unit is rotatably arranged in the arrangement unit.

3. Device according to claim 1, wherein the pick-up unit has a circular outer contour with protruding projections distributed around the circumference of the outer contour.

4. Device according to claim 1, wherein the supply unit comprises a conveying device which is designed to move conductor parts into the carry-over region.

5. Device according to claim 1, wherein the supply unit comprises a conveying device which comprises two conveying units which are designed and arranged in the supply unit in such a way that they are each designed to convey a leg of a hairpin-shaped conductor part into the carry-over region.

6. Device according to claim 1, wherein the supply unit comprises a conveying unit which in turn comprises a circulating belt.

7. Device according to claim 1, wherein the carry-over region has a first delivery portion and a second delivery portion, wherein the first delivery portion is designed for carrying over a first leg of a hairpin-shaped conductor part into the arrangement unit, and the second delivery portion is designed for carrying over a second leg of the same hairpin-shaped conductor part into the arrangement unit.

* * * * *